(12) United States Patent
Yurth et al.

(10) Patent No.: US 7,356,969 B1
(45) Date of Patent: Apr. 15, 2008

(54) ELECTRONICALLY SHADED THIN FILM TRANSPARENT MONOCHROMATIC LIQUID CRYSTAL DISPLAY LAMINATED WINDOW SHADING SYSTEM

(75) Inventors: David G. Yurth, Holiday, UT (US); Matthew A. Schadeck, Carson City, NV (US)

(73) Assignee: Electronically Shaded Glass, Inc., Salt Lake City, UT (US)

( * ) Notice: Subject to any disclaimer, the term of this patent is extended or adjusted under 35 U.S.C. 154(b) by 0 days.

(21) Appl. No.: 10/430,877

(22) Filed: May 6, 2003

(51) Int. Cl.
    *E06B 7/00* (2006.01)
(52) U.S. Cl. ..................... 52/171.3; 359/614
(58) Field of Classification Search ............... 52/171.3, 52/204.5; 359/614, 601, 591, 609, 228; 49/61, 63, 125
See application file for complete search history.

(56) References Cited

U.S. PATENT DOCUMENTS

| | | | |
|---|---|---|---|
| 4,091,610 A | 5/1978 | Sasaki et al. ............... 58/23 R |
| 4,247,929 A | 1/1981 | Sasaki et al. ............... 368/69 |
| 4,270,199 A | 5/1981 | Sasaki et al. ............... 368/224 |
| 4,582,395 A | 4/1986 | Morozumi ............... 350/334 |
| 4,641,922 A * | 2/1987 | Jacob ............................. 349/16 |
| 4,952,783 A | 8/1990 | Aufderheide et al. ....... 219/528 |
| 5,009,044 A * | 4/1991 | Baughman et al. ......... 52/171.3 |
| 5,096,801 A | 3/1992 | Koya et al. ................. 430/293 |
| 5,143,979 A | 9/1992 | Nishi et al. ............... 525/332.1 |
| 5,197,242 A * | 3/1993 | Baughman et al. ......... 52/171.3 |
| 5,223,959 A * | 6/1993 | Wu et al. ..................... 349/36 |
| 5,377,037 A * | 12/1994 | Branz et al. ................. 359/265 |
| 5,519,565 A | 5/1996 | Kalt et al. ................... 361/280 |
| 5,629,054 A | 5/1997 | Kanai ......................... 427/575 |
| 5,666,771 A * | 9/1997 | Macquart et al. .......... 52/171.3 |
| 5,880,202 A | 3/1999 | Yamashita et al. .......... 524/495 |
| 5,907,427 A | 5/1999 | Scalora et al. .............. 359/248 |
| 5,992,240 A * | 11/1999 | Tsuruoka et al. ............ 73/718 |
| 6,057,878 A | 5/2000 | Ogiwara et al. .............. 348/56 |
| 6,096,389 A | 8/2000 | Kanai ......................... 427/575 |
| 6,262,830 B1 | 7/2001 | Scalora ....................... 359/248 |
| 6,304,366 B1 | 10/2001 | Scalora et al. .............. 359/328 |
| 6,313,454 B1 * | 11/2001 | Bos et al. ................. 250/208.1 |
| 6,339,493 B1 | 1/2002 | Scalora et al. .............. 359/290 |
| 6,343,167 B1 | 1/2002 | Scalora et al. ............... 385/37 |
| 6,396,617 B1 | 5/2002 | Scalora ....................... 359/248 |
| 6,414,780 B1 | 7/2002 | D'Aguanno et al. ........ 359/241 |
| 6,468,676 B1 | 10/2002 | Ueda et al. ................. 428/690 |
| 6,666,493 B1 * | 12/2003 | Naik .......................... 296/97.4 |
| 6,847,428 B1 * | 1/2005 | Sekiguchi et al. .......... 349/139 |

(Continued)

OTHER PUBLICATIONS

M. Scalora et al., Transparent, Metallo-Dielectric, One-Dimensional, Photonic Band-Gap Structures, Journal of Applied Physics, vol. 83, No. 5, pp. 2377-2383 (Mar. 1, 1998).

*Primary Examiner*—A. Joseph Wujciak, III
(74) *Attorney, Agent, or Firm*—Schwegman, Lundberg & Woessner P.A.

(57) ABSTRACT

An electronically shaded glass window system is described that provides a progressively darkening window, based on either user input or detection of ambient light. This invention is appropriate for use in commercial buildings, residential buildings, public areas and vehicles. It enhances energy efficiency by blocking bright light thereby reducing heat. It includes a user interface, which permits a user to create opaque or alternatively transparent walls or windows as the need arises.

6 Claims, 3 Drawing Sheets

U.S. PATENT DOCUMENTS

| | | |
|---|---|---|
| 7,122,228 B2 | 10/2006 | Reiffenrath et al. |
| 2002/0021479 A1 | 2/2002 | Scalora et al. .............. 359/241 |
| 2002/0063809 A1* | 5/2002 | Fletcher ....................... 349/16 |
| 2003/0210355 A1* | 11/2003 | Dao ............................ 349/16 |

* cited by examiner

ELECTRONICALLY SHADED THIN FILM TRANSPARENT MONOCHROMATIC LIQUID CRYSTAL DISPLAY LAMINATED WINDOW SHADING SYSTEM

BACKGROUND OF INVENTION

1. Field of the Invention

This invention relates to window devices that use electronically controlled liquid crystal material to selectively modify the transparency of the otherwise transparent window material. More specifically, this invention relates to window devices that use electronically controlled liquid crystal material that provides control of the transparency by application of a phase-controlled, frequency modulated current.

2. Description of Related Art

Several transparency control devices for windows and/or liquid crystal window devices are known in the art. Generally, these systems do not provide for user-controlled transparency and do not provide maximum transparency when current/voltage is withdrawn. Moreover, prior devices do not tend to provide the capability of polarizing light to reduce glare.

Although the following may not constitute prior art to this invention, the reader is referred to the following products and U.S. patent documents for general background material. Each of these patents and other documents are hereby incorporated by reference in its entirety for the material contained therein.

Techniver Glass, of Belgium, has proposed a product identified as S.G.G. PrivaLite that is not transparent in its native state and requires a properly controlled voltage to be applied in order to achieve 70% transparency.

Pilkington Glass, of the United Kingdom, has proposed an externally applied Electro-Chromic coating called "Pilkington E Control Glass," which once the film has been applied to the exterior surface of properly prepared glass, the glass turns deepening shades of blue or other colors, as increasing amounts of voltage are applied across its surface.

M. Scalora, et al., published an article in the American Institute of Physics Journal of Applied Physics entitled Transparent, Metallo-Dielectric, One-Dimensional, Photonic Band-Gap Structures, which numerically describes the properties of metallo-dielectric, one-dimensional, photonic band-gap structures, Journal of Applied Physics, Vol. 83, No. 5, pp. 2377-2383 (1 Mar. 1998).

U.S. Pat. Nos. 4,091,610, 4,247,929 and 4,270,199 describe a thin-film transparent electrode provided on the front glass of an electronic wristwatch.

U.S. Pat. No. 4,582,395 describes an active matrix assembly for a liquid crystal display device utilizing an MIS transistor array.

U.S. Pat. No. 4,952,783 describes a flexible heater panel that comprises a light transmitting film substrate and a transparent conductive layer vacuum deposited on the substrate.

U.S. Pat. No. 5,096,801 describes a color image recording method that comprises exposing to light a light-sensitive material.

U.S. Pat. No. 5,143,979 describes a molding material suitable as an optical material and an optical recording medium.

U.S. Pat. No. 5,519,565 describes an electromagnetic-wave-modulating capacitors with movable electrodes for employment in highly transparent, conductive fixed electrodes.

U.S. Pat. Nos. 5,629,054 and 6,096,389 describe methods for continuously forming a functional deposited film of a large area with a microwave plasma-assisted CVD method.

U.S. Pat. No. 5,880,202 describes a black coating composition that comprises a light-screening material and macromolecular material.

U.S. Pat. No. 5,907,427 describes a photonic band gap structure device and method for delaying photonic signals of a predetermined frequency and a predetermined bandwidth by a predetermined delay.

U.S. Pat. No. 6,057,878 describes a three-dimensional picture image pickup apparatus.

U.S. Pat. No. 6,262,830 B1 describes a transparent metal structure that permits the transmission of light over a tunable range of frequencies.

U.S. Pat. No. 6,304,366 B1 describes a SH generator based on a photonic band gap (PBG) mixed half-quarter-wave, periodic structure.

U.S. Pat. No. 6,339,493 B1 describes a device and method of optics propagation and signal control integrated with micro-electro-mechanical-switches.

U.S. Pat. Nos. 6,343,167 B1 and 6,396,617 B1 describe a photonic band gap structure device and method for delaying photonic signals of a predetermined frequency and a predetermined bandwidth by a predetermined delay.

U.S. Pat. No. 6,414,780 B2 describes the non-linear reflectivity and non-linear transmissivity of a first photonic signal incident on a photonic band gap structure that is controlled by applying a second photonic signal to the structure.

U.S. Pat. No. 6,468,676 B1 describes an organic electro luminescent display element.

U.S. Patent Application Publication No. Us 2002/0021479 A1 describes an LCD device for displaying an image that includes pixel control electrodes constructed as a transparent metal stack having a photonic band gap structure that transmits a visible range of wavelengths and suppresses a non-visible range of wavelengths.

SUMMARY OF INVENTION

It is desirable to provide a window with an integrated window shading system. It is particularly desirable to provide a window and window shading system that provides progressive shading through the use of liquid crystal display lamination material located between two panes of window glass.

Accordingly, it is an object of this invention to provide an integrated window shading system that provides a mechanism for progressively darkening or shading the view port defined by the window.

Another object of this invention is to provide an integrated window shading system that provides a mechanism for darkening some or all of a pane of glass through the use of liquid crystal display lamination material.

A further object of this invention is to provide an integrated window shading system that can control the transfer of heat (infra-red) transmitted into an enclosure through the window by brilliant sunlight.

A still further object of this invention is to provide an integrated window shading system that is electronically controllable by a user.

It is another object of this invention to provide an integrated window shading system that provides a controllable privacy shield.

It is a further object of this invention to provide an integrated window shading system that provides a mechanism for minimizing glare.

It is a still further object of this invention to provide an integrated window shading system that provides rapid user-controllable or automatic-controlled darkening of the window in response to increases in light intensity.

Another object of this invention is to provide an integrated window shading system that reduces glare without significantly reducing transparency or light transmissivity of the window.

A further object of this invention is to provide an integrated window shading system that is compatible with use in buildings and/or vehicles.

Additional objects, advantages and other novel features of this invention will be set forth in part in the description that follows and in part will become apparent to those skilled in the art upon examination of the following or may be learned with the practice of the invention. The objects and advantages of this invention may be realized and attained by means of the instrumentalities and combinations particularly pointed out in the appended claims. Still other objects of the present invention will become readily apparent to those skilled in the art from the following description wherein there are shown and described present preferred embodiments of this invention, simply by way of illustration of the present modes best suited to carry out this invention. As it will be realized, this invention is capable of other different embodiments, and its several details, and specific components, language and package structure are capable of modification in various aspects without departing from the invention. Accordingly, the drawings and descriptions should be regarded as illustrative in nature and not as restrictive.

BRIEF DESCRIPTION OF DRAWINGS

The accompanying drawings incorporated in and forming a part of the specification, illustrate present preferred embodiments of the present invention. Some, although not all, alternative embodiments are described in the following description.

In the drawings.

Reference will now be made in detail to the present preferred embodiments of the invention, examples of which are illustrated in the accompanying drawings.

DETAILED DESCRIPTION

This invention is a window system having an integral liquid crystal (LCD) material (presently TFT monochromatic LCD material) positioned between two transparent panes of window glass, plastic, transparent aluminum or the like, which along with several other components, provides a mechanism for progressively darkening the window system. In this invention the darkening of an entire windowpane is accomplished without the use of mechanical shades, blinds, drapes or other window coverings. The darkening of the window limits the amount of heat transmitted through the window by sunlight, provides a privacy shield, and minimizes glare. This invention is appropriate for use in commercial office buildings; in residential buildings, public "wall" areas, and in some embodiments of this invention in automobiles, aircraft and space craft and other vehicles, where the control of the window system can be set to automatically darken the windows as daylight levels of sunlight increases and to lighten the windows as direct sunlight decreases through the day; in residential buildings. In the present embodiment of this invention, the LCD material is connected to an electronic controller, which is specifically adapted to gradually darken the LCD material by application of a phase-controlled and frequency modulated direct voltage current. The window system of this invention provides 100% (or near 100%) transparency when no voltage is applied and darkens to near complete opacity. In some embodiments of this invention, a user controller is provided to permit the user to set the desired amount of opacity, to program the degree of change in opacity in response sunlight, and/or to rotate the plane of polarization so that circularly polarized light ("glare") is transmitted so as to minimize glare.

Figure 1:
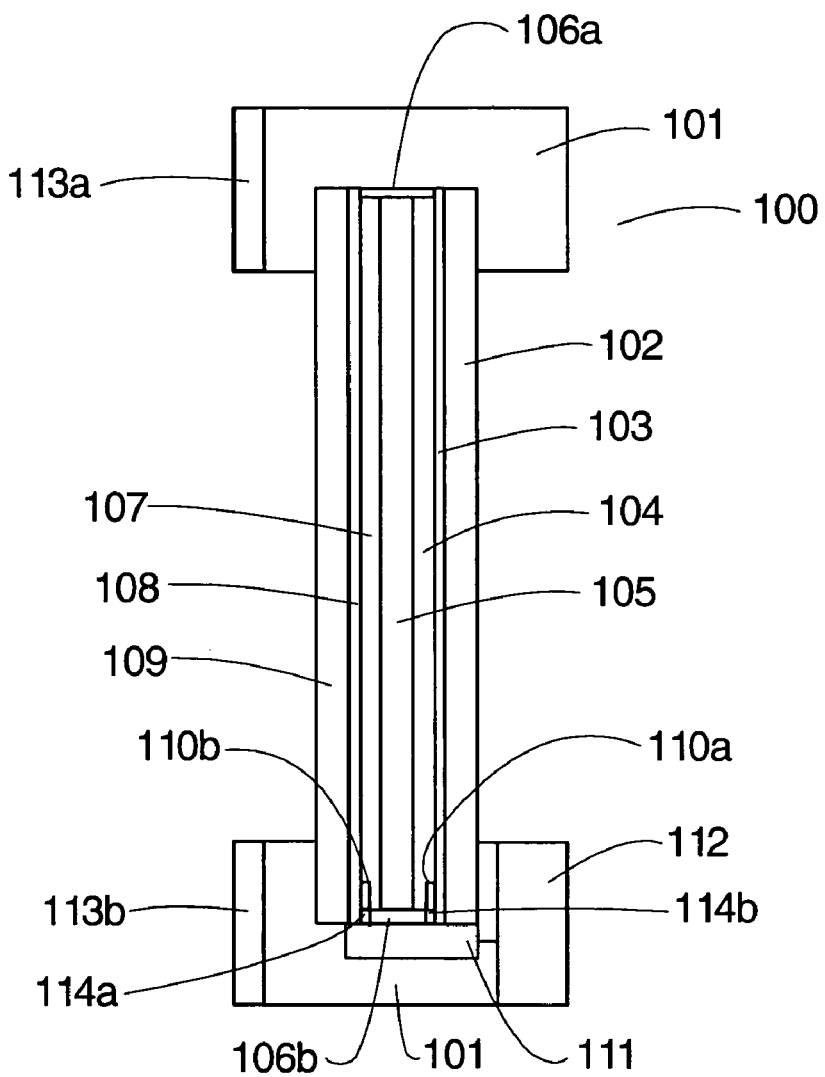
FIG. 1 is a cross-section schematic view of the present embodiment of this invention.

FIG. 1 shows a cross-section schematic view of the present embodiment of this invention 100. Within the frame 101 is held two panels of transparent material 102, 109. These transparent panels are presently composed of transparent aluminum (sintered corundum (alpha-Al2O3) with micro meter/nano-structures, as is produced by Fraunhoffer Institut for Ceramic Technologies), although in other alternative embodiments may be glass, polycarbonite material, or plastic and the like. One surface of each transparent panel 102, 109 is coated with a thin layer of electrically conductive material 103, 108. In the present embodiment of this invention the layers of electrically conductive material 103, 108 is a Indium Tin Oxide (ITO), although in alternative embodiments other optically transparent conductive materials, including but not necessarily limited to other photonic band gap materials, can be substituted without departing from the concept of this invention. A pair of gaps 104, 107 are provided between the transparent panels 102, 109 by spacers 106*a,b*. In the present embodiment the gaps 104, 107 are about 5 nm is width. Typically the spacers 106*a,b* are located in a manner, as shown here, within the frame so as to not be visible. The spacers 106*a,b* provide the desired spacing between the transparent panels 102, 109 as well as the gaps 104, 107 between the transparent panels 102, 109 and the liquid crystal panel 105. In the present embodiment the liquid crystal panel 105 is a dyed liquid crystal, which is inserted by capillary action to fill the space defined by the spacers and the transparent panels 102, 109. The present dyed liquid crystal panel 105 is formulated to allow about 90% circularly polarized light to pass through with transparency. By applying a properly modulated voltage across the dyed LCD material 105 sandwiched between the transparent panels 102, 109, the molecules of the LCD material 105 are reoriented relative to the panes of transparent panels 102, 109 to reduce the total light transmissivity and/or to reduce glare by altering the plane of polarization of the light which is permitted to pass through the window system 100. Electrical contacts (in this embodiment two contacts) 110*a,b* are connected to the electrically conductive film layers 108, 103 of the transparent panels 102, 109. Presently, one contact 110 is connected to each conductive layer. In alternative embodiments, additional contacts may be used. The electrical contacts 110*a,b* are connected 114*a,b* to a control circuit 111. The present control circuit 111 provides an intensity, waveform, amplitude, frequency, phase modulated voltage signal specifically adapted to modulate the transparency and/or polarization of the of the LCD material. A power supply 112 is provided to the control circuit 111. In some embodiments, one or more photovoltaic films are provided 113a,b to convert ambient sunlight to electric current sufficient to power the window system, while the sun is shining without the need for, or to augment, batteries or externally supplied power sources. In alternative embodiments of the invention, the LCD material can be substituted with a dyed liquid crystal film which is fixed between the transparent panels.

Figure 2:
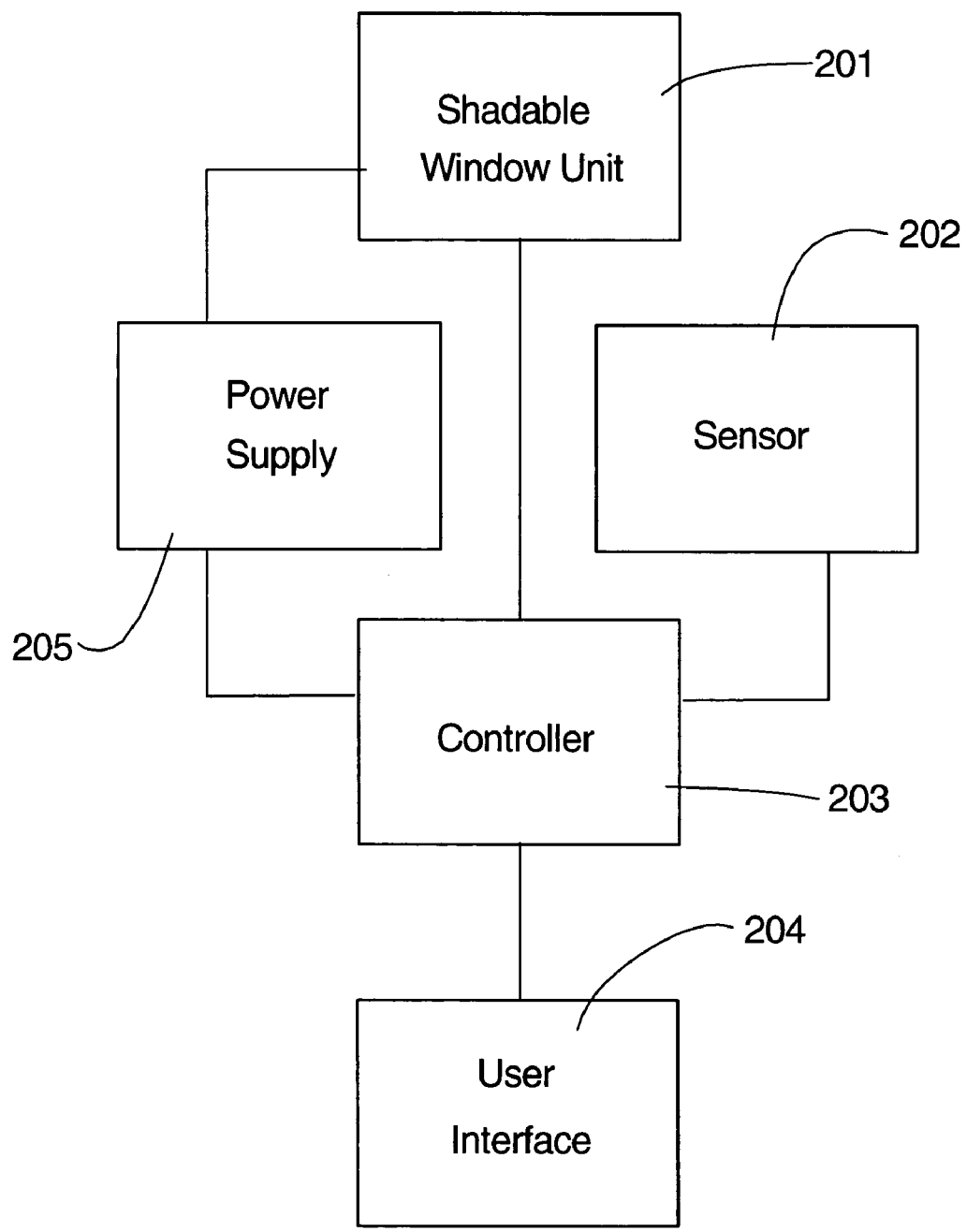
FIG. 2 is a block diagram of the present components and interrelationships of the invention.

FIG. 2 shows a block diagram of the present components and interrelationships of the invention. The shadable window unit 201 receives control signals from a controller 203, which is powered by a power supply 205. A sensor 202 is typically provided for detecting the amount of ambient light. A user interface 204 is provided in communication with the controller 203. The shadable window unit 201 includes the LCD panel sandwiched between the transparent panels as shown in FIG. 1. The controller 203 includes a programmable microprocessor device and the modulation circuit. The user interface 204, includes the capability to permit a user to manually darken on demand the transmissivity of the window system 100, as well as to program the controller 203. The user interface 204 may be electrically connected to the controller 203, or alternatively, may by a wireless "remote" controller. The power supply 205 may include an AC power connection, a battery device and/or a photovoltaic cell along with the conversion and storage circuitry required for applying power to the system. The sensor 202 is presently a photo sensor suitable to detecting the luminance of the light. In some embodiments, the sensor 202 may also detect brightness, intensity and wavelength of the light.

Figure 3:
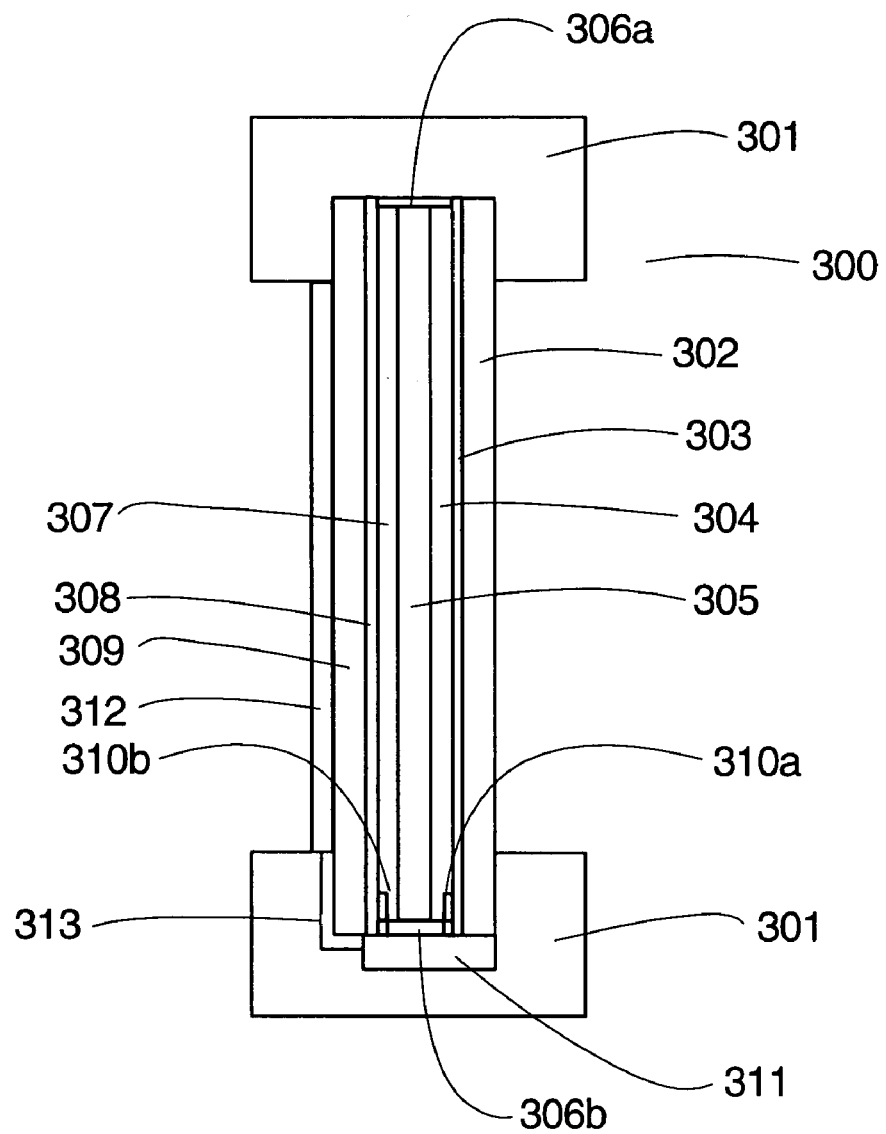
FIG. 3 is a cross-section view of an alternative embodiment of this invention.

FIG. 3 shows a cross-section view of an alternative embodiment of this invention. In this embodiment of the invention, a transparent or semi-transparent photovoltaic film 312 is applied to the outer surface of the first transparent panel 309, the other surface of which has applied the conductive layer 308. The spacers 306a,b provide the gaps 308, 304 between the transparent panels 309, 302 and the LCD panel 305, sandwiched between the transparent panels 309, 302. The second transparent panel 302 is also provided with a conductive layer 303. The photovoltaic film 312 is electrically connected 313 to the control circuit 311, which in turn is electrically connected 310a,b to the conductive layers 303, 308. The entire assembly 300 is held in place in frame 301.

It is to be understood that the above-described embodiments and examples are merely illustrative of numerous and varied other embodiments and applications which may constitute applications of the principles of the invention. These above-described embodiments are provided to teach the present best mode of the invention only, and should not be interpreted to limit the scope of the claims. Such other embodiments, may use somewhat different steps and routines which may be readily devised by those skilled in the art without departing from the spirit or scope of this invention and it is our intent that they are deemed to be within the scope of this invention.

The invention claimed is:

1. An electronic shadable window system for building comprising:
   a first transparent panel, having a first side and a second side;
   a first electrically conductive layer attached to the second side of the first transparent panel;
   a second transparent panel, having a first side and a second side;
   a second electrically conductive layer attached to the second side of the second transparent panel;
   a liquid-crystal display (LCD) material held between the first electrically conductive layer and the second electrically conductive layer, wherein the LCD material is a dyed LCD material; and
   an electrical signal source in electronic communication with the first electrically conductive layer and the second electrically conductive layer, and wherein the dyed LCD material exhibits a greater transparency when no voltage is applied from the electrical signal source, than when a voltage is applied.

2. The system of claim 1, further including a controller in electronic communication with the LCD material.

3. The system of claim 2, wherein the controller is configured to simultaneously modulate a polarization and transmissivity of light that passes through the first and second transparent panels.

4. The system of claim 2, wherein the controller is configured to provide a phase-controlled, frequency modulated current.

5. The system of claim 2, wherein the controller is configured to modulate voltage, amperage, frequency, phasing, and wave-form of a single signal to simultaneously control a polarization and transmissivity of light that passes through the first and second transparent panels.

6. The system of claim 1, further including a controller in electronic communication with the LCD material, wherein the controller is configured to simultaneously modulate a polarization and transmissivity of light that passes through the first and second transparent panels, and wherein the controller is configured to provide a phase-controlled, frequency modulated current.

* * * * *